United States Patent
Chao et al.

(10) Patent No.: US 8,529,686 B2
(45) Date of Patent: Sep. 10, 2013

(54) DIS-AZO COMPOUND AND OIL INK AND ELECTROWETTING DISPLAYS COMPRISING THE SAME

(75) Inventors: Yu-Chou Chao, Taipei (TW); Yi-Fen Chiang, Taipei (TW)

(73) Assignee: Jintex Corporation, Ltd., Taipei (TW)

( * ) Notice: Subject to any disclaimer, the term of this patent is extended or adjusted under 35 U.S.C. 154(b) by 324 days.

(21) Appl. No.: 13/100,722

(22) Filed: May 4, 2011

(65) Prior Publication Data

US 2012/0090502 A1 Apr. 19, 2012

(30) Foreign Application Priority Data

Oct. 15, 2010 (TW) ................................ 99135185 A

(51) Int. Cl.
*C09D 11/02* (2006.01)
*C09B 31/14* (2006.01)

(52) U.S. Cl.
USPC ............... 106/31.48; 106/31.57; 534/762

(58) Field of Classification Search
USPC ................ 106/31.48, 31.57; 534/762, 787, 534/797
See application file for complete search history.

(56) References Cited

U.S. PATENT DOCUMENTS

| | | | | |
|---|---|---|---|---|
| 3,119,806 A | * | 1/1964 | Voltz et al. | 534/611 |
| 4,224,071 A | * | 9/1980 | Buell | 106/31.48 |
| 4,565,424 A | * | 1/1986 | Huffman et al. | 534/762 |
| 4,667,020 A | * | 5/1987 | Etzbach et al. | 534/762 |
| 4,927,538 A | * | 5/1990 | Senshu et al. | 210/634 |
| 5,097,029 A | * | 3/1992 | Shannon | 534/762 |
| 5,326,865 A | * | 7/1994 | Grasso et al. | 534/762 |
| 5,589,100 A | * | 12/1996 | Grasso et al. | 252/299.01 |

FOREIGN PATENT DOCUMENTS

| | | | |
|---|---|---|---|
| JP | 60/101165 | * | 6/1985 |
| JP | 2000239548 A | * | 9/2000 |

OTHER PUBLICATIONS

Machine translation of JP 2000/239548; Sep. 2000.*

* cited by examiner

*Primary Examiner* — Helene Klemanski

(57) ABSTRACT

The present invention provides a dis-azo compound and an oil ink comprising the same. The dis-azo compound is represented by the following formula (I):

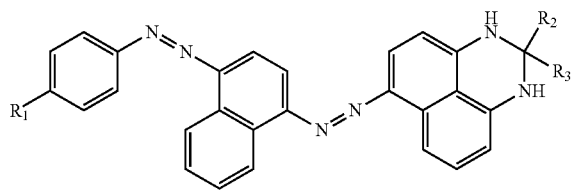

wherein $R_1$ represents substituted or unsubstituted C4~C16 alkyl, and $R_2$ and $R^3$ independently represent substituted or unsubstituted C1~C6 alkyl. Besides, the present invention also provides an electrowetting display using the oil ink.

13 Claims, 2 Drawing Sheets

DIS-AZO COMPOUND AND OIL INK AND ELECTROWETTING DISPLAYS COMPRISING THE SAME

BACKGROUND OF THE INVENTION

1. Field of the Invention

The present invention is related to a novel dis-azo compound, and more particularly to a novel dis-azo compound with high molar absorption coefficient and good solubility in solvents and neutral hue.

2. Description of the Related Art

Currently, the development of flexible displays is still in research and development stage. There are a lot of developed technologies which mainly contain technologies of liquid crystal display (LCD), electrophoretic display (EPD), organic light-emitting diode (OLED), and so on. The cholesteric liquid crystal display possesses the advantages of bistable states and no need for color filters, resulting from owning color per se, but it has the disadvantages of excessively high driving voltage and slow response speed. The electrophoretic technology with high reflectivity, high contrast, and bistable states predominantly led and developed by E-ink and SiPix can be used with flexible substrates in coordination, which has currently been developed and used to manufacture commercial productions of electronic book. However, the issues for poor effect of colorization and slow response speed in the electrophoretic technology still cannot be overcome, resulting in market acceptability to be limited.

Liquavista proposed two possible display modes of color electrowetting display which belong to single-layer and multi-layer structures, respectively. The single-layer electrowetting display is manufactured by using black oil ink and color filters in coordination, whose process is simpler; however, no black oil ink with neutral hue, high oil-soluble property, high molar absorption coefficient, low viscosity, and fast response speed can be used together at the present time to enhance contrast ratio so that electrowetting technology is applied in animation.

Philips first developed a prototype of flexible display based on the electrowetting principle in September 2003, which utilizes electrowetting behavior of non-polar oil ink on hydrophobic dielectric layer as an operation principle. When no voltage is applied to elements, the affinity of non-polar oil ink to the hydrophobic dielectric layer is stronger than that of polar aqueous solution so that the oil ink is spread on the surface of hydrophobic dielectric layer, and thereby the displayed color of spread oil ink is seen when we overlook the pixels. When voltage is applied to said elements, the polar liquid is attracted by the induced charges formed on hydrophobic dielectric layer to drive the oil layer to be moved to corners of pixels, and thereby the color of the bottom of panel is seen when we overlook the pixels.

In these days, green energy-saving consciousness emerges and energy-saving and carbon reduction concepts are steadily on the increase. The electrowetting technology has evolved into the trend that can not be ignored because it can provide clear images in all lighting condition no matter when it is a sunny day or in a dim office, and merely need a tenth of power consumption of liquid crystal display with a similar size due to no need of backlight source. The energy-saving character is very suitable to be used in portable electronic product.

Reflective displays with reflectivity of more than 35% and contrast ratio of more than 15 can be manufactured by the electrowetting technology. In comparison with other display technologies, these properties are close to reflectivity of 35% and contrast of 15 of paper, so the reading comfortably of reflective displays would match with the traditional paper. Besides, one of important characters of the reflective displays is low operating voltage, resulting in not only low power consumption for driving exhibition of screen but also the ability to play continuous dynamic images.

Images displayed by changing applied voltage to control contact angle of oil ink mainly utilize the color of oil ink to display color. Therefore, the gamut of color depends on hue of oil ink. Also, dyes are the central roles for forming oil ink, so they are the core of electrowetting technology.

Elementary conditions of oil ink for electrowetting display are (1) non-polar; (2) low viscosity (<3.0 cps); (3) low surface tension (<30 mN/m); (4) requirement for ambient temperature for displays that dyes do not decompose at $-10\sim70°$ C.; (5) intensity of visible absorption uniformly covering 400-800 nm; (6) molar absorption coefficient ($\in$) of more than $2\times10^3$ $(cm \cdot M)^{-1}$; (7) FoM (Figure of Merit) equal to $\in \times C$ of 100~1000, in which C is a concentration (M); (8) hue close to standard black (L=0, a=0, b=0); (9) visible light transmittance (T %) from 10 μm test cell injected with oil ink of less than 10%.

Commercial black dyes are obtained by mixing red, yellow, and blue (i.e. three primary colors) dyes or orange, navy, and so on dyes, whose disadvantages are poor color reproducibility after mixing color due to different oil-soluble properties among dyes. Currently, no dyes with neutral hue, high oil-soluble property and excellent fastness can be provided for electrowetting technology, especially single black dye. The brightness level of each of color is mainly controlled by black. When hue is not enough neutral, deviation and distortion of color would easily occur after color combination.

Conventional dis-azo black dyes possess poor solubility in linear alkanes with long carbon chain as solvents and not enough broad and even absorption intensity of visible wavelengths at 400-800 nm. Besides, when the concentration of dye is enhanced, the viscosity would rapidly increase. Therefore, the need for light and thin electrowetting displays cannot be satisfied.

Commercial black oil ink for electrowetting display is obtained by formulating three-color (red, yellow, and blue) or two-color (red and green) oil-soluble dyes at a suitable ratio. Because the solubility of each of dyes in solvent is different, the formulated black oil ink has disadvantages of poor hue, stability, and color reproducibility; therefore, the applications of the electrowetting displays are restricted.

SUMMARY OF THE INVENTION

In view of foregoing disadvantages, one object of the present invention is to develop a black dye with neutral hue and good absorbance and high solubility in solvents by means of design of dye structures. Moreover, the level of preparation of electrowetting displays can be significantly enhanced by the black dye.

Another object of the present invention is to develop a black oil ink with neutral hue, high oil-soluble property and molar absorption coefficient, low viscosity and specified surface tension, and fast response speed.

To achieve the above objects, the present invention provides a dis-azo compound represented by the following formula (I):

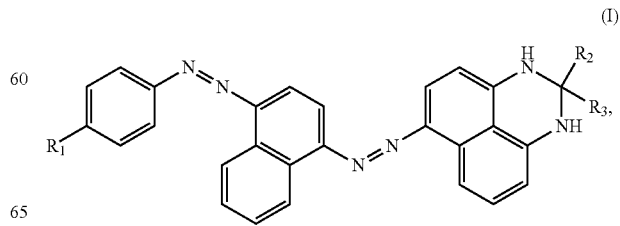

wherein $R_1$ is substituted or unsubstituted C4~C16 alkyl, and $R_2$ and $R_3$ are independently substituted or unsubstituted C1~C6 alkyl.

In a preferred embodiment, $R_1$ is unsubstituted C4~C16 alkyl, and $R_2$ and $R_3$ are independently methyl, ethyl, or unsubstituted linear or branched C3~C6 alkyl.

In a preferred embodiment, $R_1$ is unsubstituted linear C4~C16 alkyl, and $R_2$ and $R_3$ are independently methyl, ethyl, iso-butyl, or n-butyl.

In a preferred embodiment, the dis-azo compound represented by the formula (I) has absorption at 400-800 nm.

In a preferred embodiment, the dis-azo compound represented by the formula (I) has a Figure of Merit of more than 100.

The present invention also provides an oil ink for electrowetting display, comprising 1 wt %~20 wt % of the dis-azo compound represented by the formula (I), and 80 wt %~99 wt % of a non-polar solvent.

In a preferred embodiment, the dis-azo compound represented by the formula (I) is present in an amount of 5 wt %~15 wt %.

In a preferred embodiment, the non-polar solvent is linear or branched C6~C20 alkanes. More preferably, the non-polar solvent is n-hexane, n-octane, n-decane, n-dodecane, n-tetradecane, n-hexadecane, or mixture thereof.

In a preferred embodiment, the oil ink further comprises a conventional dye.

In a preferred embodiment, the oil ink is used for coating on a hydrophobic dielectric layer of the electrowetting display.

Yet the present invention provides an electrowetting display, characterized by comprising the foregoing dis-azo compound represented by the formula (I).

The present invention also provides an electrowetting display, characterized by comprising the foregoing oil ink.

The dis-azo compound developed by the present invention has good solubility in linear alkanes with long carbon chain as solvents and even absorption intensity of visible wavelengths, so its oil ink has advantages of neutral hue, and good storage stability and color reproducibility. Therefore, the application of the electrowetting displays is significantly enhanced.

DETAILED DESCRIPTION OF THE PRESENT INVENTION

Figure 1:
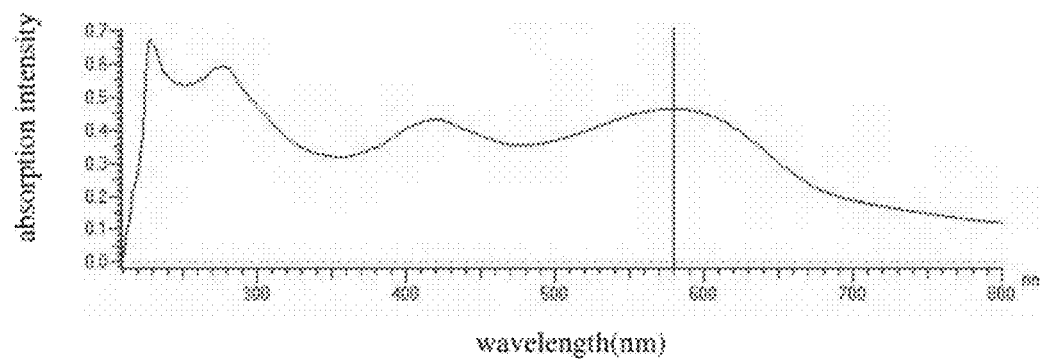
FIG. 1 shows the UV-Vis absorption spectra of the dis-azo compound represented by the formula (I) of the present invention (D10-C4,4), in which $R_1$ is n-decyl; $R_2$ and $R_3$ are both iso-butyl.

The present invention provides a novel dis-azo compound which can be used as a black dye. Since the novel dis-azo compound has advantages of neutral hue, even absorption intensity of visible wavelengths, and high solubility in non-polar solvents, it is extremely suitable to be formulated as a black oil ink for electrowetting display.

The dis-azo compound provided by the present invention is represented by the following formula (I):

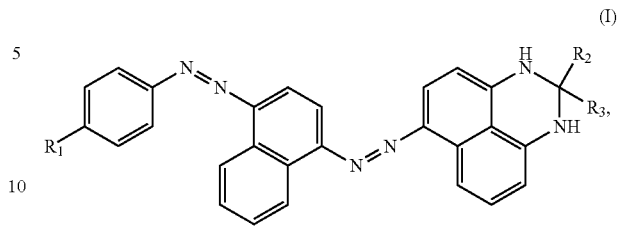

(I)

wherein $R_1$ is substituted or unsubstituted C4~C16 alkyl, and $R_2$ and $R_3$ are independently substituted or unsubstituted C1~C6 alkyl.

Preferably, $R_1$ is unsubstituted C4~C16 alkyl, and $R_2$ and $R_3$ are independently methyl, ethyl, or unsubstituted linear or branched C3~C6 alkyl. More preferably, $R_1$ is unsubstituted linear C4~C16 alkyl such as n-butyl, n-hexyl, n-octyl, n-decyl, n-dodecyl, n-tetradecyl, or n-hexadecyl. Even more preferably, $R_1$ is unsubstituted linear C6~C12 alkyl. Most preferably, $R_1$ is unsubstituted linear C8~C10 alkyl. Preferably, $R_2$ and $R_3$ are independently methyl, ethyl, iso-butyl, or n-butyl.

The synthesis of the dis-azo compound of the present invention can be accomplished by the conventional method in the art and no particular recital is imposed on the same. The three schemes described below are used for illustrating the organic synthetic approach of the dis-azo compound of the present invention, in which $R_1$, $R_2$, and $R_3$ are defined as above.

As shown in those schemes, the dis-azo compound represented by the formula (I) of the present invention is synthesized by following process. Firstly, the compound of the formula (II) is diazotized, and then reacted with 1-naphthylamine to obtain a monoazo compound of formula (III), as shown in Scheme I. Subsequently, 1,8-diaminonaphthalene is reacted with the reagent of formula (IV) to obtain a intermediate of formula (V), as shown in Scheme II. Finally, the monoazo compound of formula (III) is diazotized, and then reacted with the intermediate of formula (V) to give the dis-azo compound of the formula (I) of the present invention, as shown in Scheme III. It should be understood that the dis-azo compound of the present invention can be synthesized via other synthetic approaches, so the Schemes I to III are merely used for illustration, which is not used for limiting the present invention.

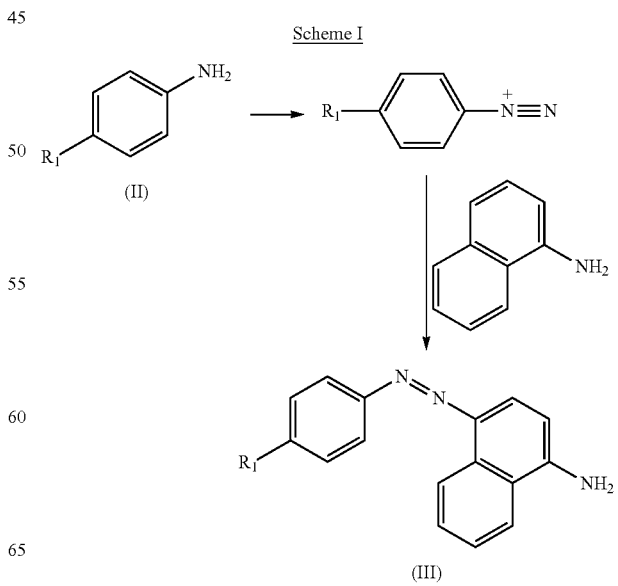

Scheme II

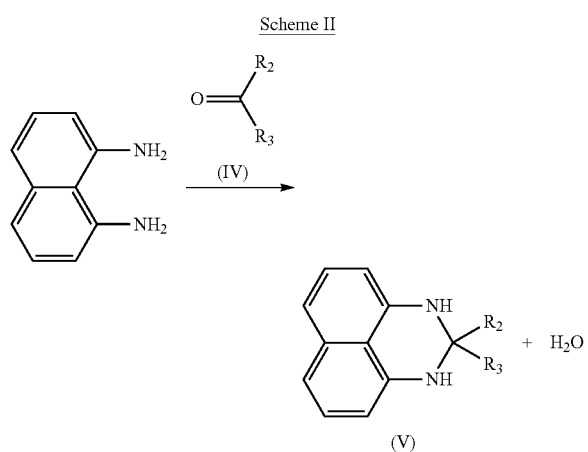

Scheme III

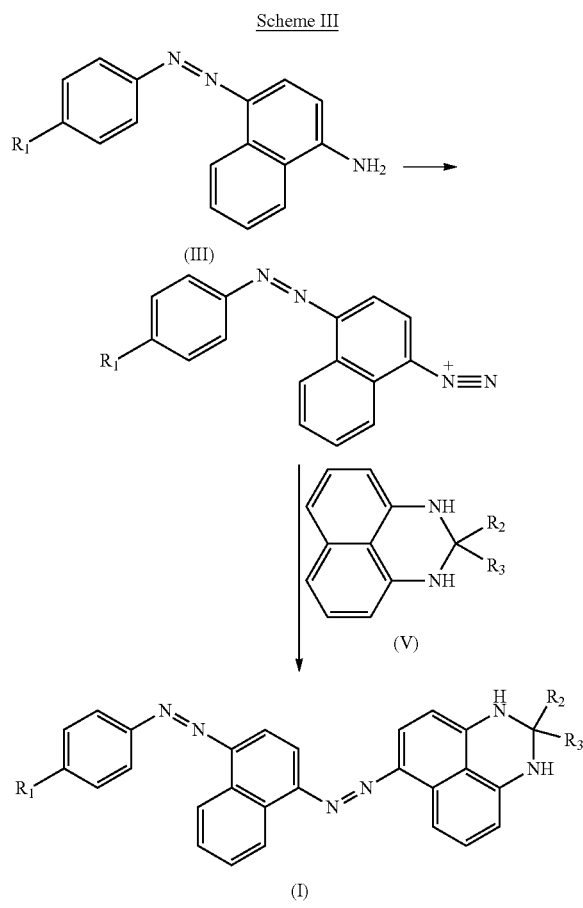

The dis-azo compound in the present invention has even absorption at 400-800 nm and Figure of Merit (FoM) of more than 100, so it is extremely suitable to be formulated as an oil ink for electrowetting display. Thus, the present invention also provides an oil ink for electrowetting display comprising 1 wt %~20 wt % of the dis-azo compound and 80 wt %~99 wt % of a non-polar solvent.

In a preferred embodiment, the amount of the dis-azo compound is 5 wt %~15 wt %.

It is easily understood that the non-polar solvent used in the present invention means a solvent with non-polarity and the ability to dissolve the dis-azo compound therein. For example, the non-polar solvent may be linear or branched C6~C20 alkanes (such as n-hexane, n-octane, n-decane, n-dodecane, n-tetradecane, n-hexadecane, or mixture thereof).

In a preferred embodiment, the oil ink further comprises a conventional dye.

In a preferred embodiment, the oil ink is used for coating on a hydrophobic dielectric layer of the electrowetting display.

Yet the present invention provides an electrowetting display, characterized by comprising the foregoing dis-azo compound represented by the formula (I).

The present invention also provides an electrowetting display, characterized by comprising the above-mentioned oil ink of the present invention.

The technical features of the present invention have already recited in the description of specification. Other materials and formulas belong to traditional knowledge in the art, and those skilled in the art can implement the present invention accordingly. The following examples are used to demonstrate the technical features and advantages of the present invention clearly.

Example 1

Synthesis of the Dis-Azo Compound of the Present Invention (1) Diazotization:

2.9 g of p-n-decylaniline weighed was added to 6 mL of isopropanol and then the mixture was stirred at room temperature until there was complete dissolution of p-n-decylaniline. After that, the 20 mL of 5N HCl was added with well stirring and cooled to below 5° C. by ice-containing pot and then 70 mL of 40% $NaNO_2$ was added. After the reaction solution showed transparently yellow, 2.0 g of sulfamic acid was added and excess $NaNO_2$ were confirmed with KI test paper until they were absent. The resulting solution was a diazo component-1.

(2) Preparation of the Monoazo Compound of Formula (III) ($R_1$ is n-Decyl):

1.4 g of α-naphthylamine weighed was added to 50 mL of $H_2O$ and 3 mL of 5N HCl and then the mixture was heated to 60° C. and stirred for 30 min. After α-naphthylamine was totally dissolved, the mixture was cooled to 40° C. for storage as a coupling component-1. One-third of the coupling component-1 was quickly added to the diazo component-1 prepared above. The reaction temperature was controlled to below 5° C. and then 10 mL of sodium acetate solution was added. After the reaction solution was stirred for 10 min, the remaining coupling component-1 (i.e. two-thirds of the coupling component-1) was slowly added therein. The completion of the reaction was confirmed by TLC, wherein the eluent of TLC was n-hexane/ethyl acetate (3/1). The reacted mixture was filtered to obtain a crude wet cake of the monoazo compound of formula (III), wherein $R_1$ is n-decyl.

(3) Purification of the Monoazo Compound of Formula (III) ($R_1$ is n-Decyl):

The crude wet cake obtained above was taken out and then added to 100 mL of acetone. The resulting mixture was stirred at room temperature for 10 min and then filtered. The above-mentioned steps were repeated twice. After drying, 3.5 g (yield of about 90%) of a purified monoazo compound of formula (III) ($R_1$ is n-decyl) as a purple powder was obtained. The solution obtained by dissolving the purified monoazo compound into dodecane showed yellow and the solution obtained by dissolving the purified monoazo compound into ethanol showed purple.

(4) Preparation of the Intermediate of Formula (V) ($R_1$ and $R_2$ Both are Ethyl):

1.64 g of 1,8-diaminonaphthalene weighed was added to 50 mL of water and then the mixture solution was heated to 60° C. and stirred for uniformly dispersing. After that, 1.5 mL of concentrated sulfuric acid was added. At this time, a muddy red-brown dispersion solution was formed. After introducing and stirring for one hour, 1.0 mL of 3-pentanone (i.e. the compound of formula (IV), in which $R_2$ and $R_3$ are both ethyl) was quickly added and then the mixture solution was heated to 88° C. to reflux for 30 hours. After 20 mL of water was added and stirred for 30 min, the resulting mixture was filtered to obtain a crude wet cake of the intermediate of formula (V), in which $R_2$ and $R_3$ are both ethyl.

(5) Purification of the Intermediate of Formula (V) ($R_1$ and $R_2$ Both are Ethyl):

The crude wet cake obtained above was added to 50 mL of water and stirred at room temperature for 10 min and then filtered to obtain a wet cake. Subsequently, the wet cake obtained was washed with 50 mL of the mixture solvent of MeOH and water (1/1) and then 50 mL of acetone. After that, the washed wet cake was taken out and dried to give a purified intermediate of formula (V) (1.58 g) as a dark brown powder, wherein $R_2$ and $R_3$ are both ethyl.

(6) Diazotization of the Monoazo Compound of Formula (III) ($R_1$ is n-Decyl):

3.88 g of the purified monoazo compound of formula (III) ($R_1$ is n-decyl) prepared above was added to 200 mL of glacial acetic acid and then heated to 70° C. and stirred for totally dissolving. Subsequently, the resulting mixture was removed to ice bath pot containing ice and 100 mL of water. The resulting mixture was cooled to below 5° C. and then 10 mL of 40% $NaNO_2$ was added. After transparently orange reaction solution was formed, 2.5 g of sulfamic acid was added and excess $NaNO_2$ were confirmed with KI test paper until they were absent. The resulting solution was a diazo component-2.

(7) Preparation of the Dis-Azo Compound of Formula (I) ($R_1$ is n-Decyl; $R_2$ and $R_3$ Both are Ethyl):

2.3 g of the purified intermediate of formula (V) ($R_2$ and $R_3$ are both ethyl) prepared above was added to 250 mL of water and stirred at room temperature for 1.5 hours for uniformly dispersing. The resulting mixture was stored as a coupling component-2. The coupling component-2 was slowly added to the diazo component-2 and the reaction temperature was adjusted to below 5° C. After black substances were suspended on the surface of reaction solution, NaOH solution was added to adjust pH value to more than 3. At this time, black dyes were agglutinated and suspended and then filtered to obtain a wet cake, i.e. a crude dis-azo compound of formula (I), wherein $R_1$ is n-decyl; $R_2$ and $R_3$ both are ethyl.

(8) Purification of the Dis-Azo Compound of Formula (I) ($R_1$ is n-Decyl; $R_2$ and $R_3$ Both are Ethyl):

The wet cake obtained above was taken out and 100 mL of acetonitrile was then added. After being stirred at room temperature for 10 minutes, the mixed solution was filtered. The above-mentioned steps were repeated once to give 3.1 g of a purified dis-azo compound represented by the formula (I) as black viscous substance, wherein $R_1$ is n-decyl; $R_2$ and $R_3$ are both ethyl. The solution obtained by dissolving the dis-azo compound into dodecane showed black.

(9) Preparation of Other Dis-Azo Compound of Formula (I):

Other embodiments of the dis-azo compound of formula (I) were prepared as the above-mentioned process except that the compound of formula (II) and the reagent of formula (IV) were replaced in accordance with the desired dis-azo compound of formula (I). The corresponding compound of formula (II) and reagent of formula (IV) used were listed in Table 1. The other embodiments of dis-azo compound of formula (I) synthesized were listed in Table 2.

Besides, Table 2 also exhibited solubility in dodecane, maximum absorption wavelength, molar absorption coefficient, and appearance of the dis-azo compound of the present invention.

TABLE 1

| $R_1$ | name of the compound of formula (II) used | $R_2$ | $R_3$ | name of the reagent of formula (IV) used |
|---|---|---|---|---|
| n-butyl | p-n-butylaniline | iso-butyl | iso-butyl | diiso-butyl ketone |
| n-octyl | p-n-octylaniline | ethyl | ethyl | 3-pentanone |
| n-octyl | p-n-octylaniline | iso-butyl | iso-butyl | diiso-butyl ketone |
| n-decyl | p-n-decylaniline | methyl | n-butyl | 2-hexanone |
| n-decyl | p-n-decylaniline | iso-butyl | iso-butyl | diiso-butyl ketone |

TABLE 2

| code name of dye | the dis-azo compound of formula (I) used | | | solubility (%) | wavelength (nm)/ dodecane | ε (molar absorption coefficient) | appearance of product |
|---|---|---|---|---|---|---|---|
| | $R_1$ | $R_2$ | $R_3$ | | | | |
| D4-C4,4 | n-butyl | iso-butyl | iso-butyl | 4.00% | 560 | $3.41 \times 10^3$ | black |
| D8-C2,2 | n-octyl | ethyl | ethyl | 6.00% | 580 | $7.05 \times 10^3$ | black |
| D8-C4,4 | n-octyl | iso-butyl | iso-butyl | 2.96% | 580 | $9.50 \times 10^3$ | black |
| D10-C2,2 | n-decyl | ethyl | ethyl | 8.00% | 580 | $8.13 \times 10^3$ | black |
| D10-C1,4 | n-decyl | methyl | n-butyl | 2.15% | 560 | $9.11 \times 10^3$ | black |
| D10-C4,4 | n-decyl | iso-butyl | iso-butyl | 1.23% | 590 | $9.95 \times 10^3$ | black |

Example 2

Preparation and Performance Test of the Oil Ink of the Present Invention 1.0 g of purified dye (dis-azo compound of the present invention) weighed was dispersed in 10 g of dodecane and then heated to 80° C. and stirred for one hour. After that, the mixture solution was removed to a ultrasonic oscillator and oscillated for one hour and then filtered through 0.45 μm filter to obtain the oil ink of the present invention. The oil ink of the present invention was tested by UV-Vis spectrophotometer. The tested results were shown in FIG. 1 and Table 3. According to Table 3, ail of the oil ink of the present invention fulfills elementary conditions of oil ink for electrowetting display.

TABLE 3

| code name of dye | the dis-azo compound of formula (I) used | | | viscosity (cp) | surface tension (dyne/cm$^2$) | full width at half maximum* (nm) | FoM | value of L/a/b |
|---|---|---|---|---|---|---|---|---|
| | $R_1$ | $R_2$ | $R_3$ | | | | | |
| D4-C4,4 | n-butyl | iso-butyl | iso-butyl | 2.21 | 24.5 | 250 | 191 | x |
| D8-C2,2 | n-octyl | ethyl | ethyl | 2.42 | 23.2 | 300 | 526 | x |
| D8-C4,4 | n-octyl | iso-butyl | iso-butyl | 2.33 | 23.5 | 300 | 320 | x |
| D10-C2,2 | n-decyl | ethyl | ethyl | 2.35 | 25.1 | 320 | 779 | 0.01/0.38/−0.18 |
| D10-C1,4 | n-decyl | methyl | n-butyl | 2.42 | 23.6 | 320 | 232 | x |
| D10-C4,4 | n-decyl | iso-butyl | iso-butyl | 2.55 | 24.8 | 320 | 136 | x |

*Full width at half maximum is defined as wavelength range of half height of absorption intensity at maximum absorption wavelength (λ max).

Example 3

Performance Test for the Electrowetting Display of the Present Invention

The testing device in the example with a size of 5×5 (length×width) cm$^2$ included layers arranged in the following order: a substrate, a hydrophobic dielectric layer with a thickness of 0.8 μm, an oil ink layer with a thickness of 7.5 μm and a pixel size of 302×302 μm$^2$, and a water layer having a thickness of 200 μm, in which the substrate was a ITO glass coated with water-resistant seal paste.

The oil ink layer was coated on the hydrophobic dielectric layer by dip-coating. D 10-C2,2 was used as a black dye in the oil ink of the example and conventional dye, Sudan Black, was used as a black dye in the oil ink of the comparative example.

Figure 2:
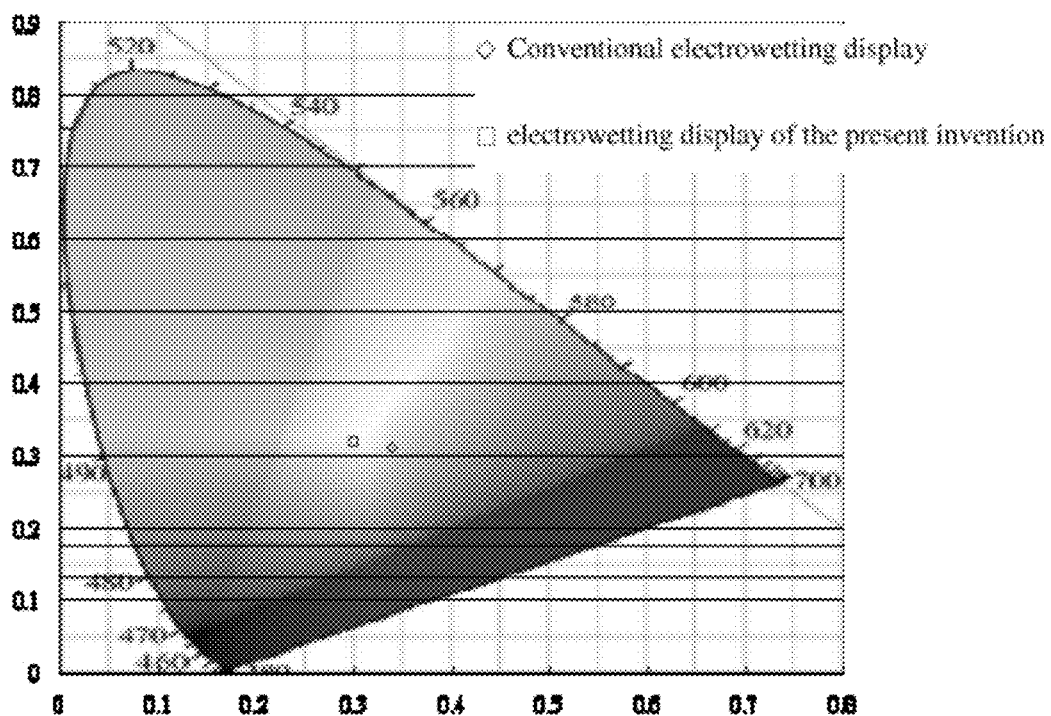
FIG. 2 shows test results of color gamut of electrowetting displays according to the example and the comparative example.

The electrowetting displays of the example and the comparative example were tested for their color gamut, which was conducted by measurement with visible spectrophotometer and then conversion of the obtained data into stimulus values of CIE chromaticity coordinate (X,Y), wherein the concentration of testing oil ink was 8%(w/w). The test results were shown in FIG. 2. FIG. 2 exhibited the test results of color gamut of electrowetting displays according to the example and the comparative example. When the coordinate (X,Y) is closer to (0.33,0.33), color saturation is less, i.e. deviation of color is less. As shown in FIG. 2, the electrowetting display of the present invention has a more neutral hue, obviously suggesting that the oil ink of the present invention has more neutral hue than conventional oil ink.

Further, test for response speed (ms) of the electrowetting displays of the present invention was conducted. The test results indicated that the electrowetting display of the present invention has a response time of 28 ms when voltage is applied and a response time of 53 ms when voltage is switched off.

To sum up above, the present invention provides a novel dis-azo compound that can be used as a black dye. Because the novel dis-azo compound has advantages of neutral hue, even absorption intensity of visible wavelengths, and high solubility in solvents, it is extremely suitable to be formulated as a black oil ink for electrowetting display.

Other Embodiments

All of the features disclosed in this specification may be combined in any combination. Each feature disclosed in this specification may be replaced by an alternative feature serving the same, equivalent, or similar purpose. Thus, unless expressly stated otherwise, each feature disclosed is only an example of a generic series of equivalent or similar features.

Furthermore, from the above description, one skilled in the art can easily ascertain the essential characteristics of the present invention, and without departing from the spirit and scope thereof, can make various changes and modifications of the invention to adapt it to various usages and conditions. Thus, other embodiments are also within the claims.

What is claimed is:

1. A dis-azo compound represented by the following formula (I):

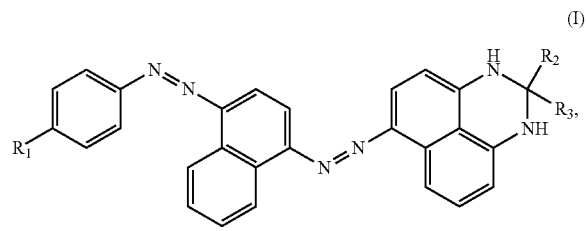

wherein $R_1$ is substituted or unsubstituted C4~C16 alkyl, and $R_2$ and $R_3$ are independently substituted or unsubstituted C1~C6 alkyl.

2. The dis-azo compound according to claim 1, wherein $R_1$ is unsubstituted C4~C16 alkyl, and $R_2$ and $R_3$ are independently methyl, ethyl, or unsubstituted linear or branched C3~C6 alkyl.

3. The dis-azo compound according to claim 2, wherein $R_1$ is unsubstituted linear C4~C16 alkyl, and $R_2$ and $R_3$ are independently methyl, ethyl, iso-butyl, or n-butyl.

4. The dis-azo compound according to claim 1, which has absorption at 400-800 nm.

5. The dis-azo compound according to claim 1, which has a Figure of Merit of more than 100.

6. An oil ink for electrowetting display, comprising:
   1 wt %~20 wt % of the dis-azo compound according to claims 1; and
   80 wt %~99 wt % of a non-polar solvent.

7. The oil ink according to claim 6, wherein the dis-azo compound is present in an amount of 5 wt %~15 wt %.

8. The oil ink according to claim 6, wherein the non-polar solvent is linear or branched C6~C20 alkanes.

9. The oil ink according to claim 8, wherein the non-polar solvent is n-hexane, n-octane, n-decane, n-dodecane, n-tetradecane, n-hexadecane, or mixture thereof.

10. The oil ink according to claim 6, which further comprises a conventional dye.

11. The oil ink according to claim 6, which is used for coating on a hydrophobic dielectric layer of the electrowetting display.

12. An electrowetting display, characterized by comprising the dis-azo compound according to claim 1.

13. An electrowetting display, characterized by comprising the oil ink according to claim 6.

* * * * *